2,809,939
Patented Oct. 15, 1957

2,809,939

FLUIDIZED SILICA GEL CATALYSTS CONTAINING VANADIUM PENTOXIDE AND OXIDES OF METALS OF GROUP III–B AND IV–A

James K. Dixon, Riverside, Conn., Samuel W. Tribit, Hawthorne, N. Y., and Wesley O. Fugate, Old Greenwich, Conn., assignors to American Cyanamid Company, New York, N. Y., a corporation of Maine No Drawing. Application November 18, 1954, Serial No. 469,842

8 Claims. (Cl. 252—456)

This invention relates to catalysts for the vapor phase catalytic oxidation of hydrocarbons, especially useful in oxidizing naphthalene to produce a converter product relatively rich in 1,4-naphthoquinone, and to the process of preparing such catalysts. Throughout the remainder of the specification and claims, it will be understood that the term naphthoquinone is limited to the 1,4-isomer, as the other theoretically existing isomers are not obtained by the vapor phase oxidation of naphthalene. More particularly, the invention relates to a fluidized catalyst for oxidizing naphthalene to naphthoquinone.

In the past, the catalytic vapor phase oxidation of naphthalene has achieved enormous commercial success for the production of phthalic anhydride. Originally, the practical processes involved converters using fixed beds of catalysts. More recently, fluidized catalyst plants have been designed for the production of phthalic anhydride.

In the production of phthalic anhydride, every effort is made to react all of the naphthalene and to produce as little naphthoquinone as possible. Unreacted naphthalene in the converter product presents a purification problem and also results in lowered yields. Similarly, naphthoquinone which tends to form colored impurities, is kept to minimum.

Recently, there has been developed a process, described and claimed in the co-pending application of Lecher and Whitehouse, Serial No. 236,844, filed July 14, 1951, now U. S. Letters Patent 2,652,408, for the production of anthraquinones using as a raw material converter products containing naphthoquinone.

Pure naphthoquinone has been, of course, more or less of a laboratory curiosity and cannot be produced on a large scale at moderate cost. Attempts have been made to produce a converter product which has a relatively higher content of naphthoquinone. These attempts have not been successful with fixed bed catalytic process. However, we have found that with fluidized catalysts it is possible to produce a converter product having a much higher naphthoquinone content by following certain definite procedures. More specifically, we have found that certain silica gel catalysts of a particle size suitable for fluidization, having vanadium pentoxide as its major catalytic component, stabilized with an alkali metal salt and promoted with an oxide of a metal from group III–B or IV–A of the periodic system, are especially valuable, not only for oxidizing naphthalene to naphthoquinone, but also for oxidizing hydrocarbons in general.

The first essential of the process using the catalyst of the present invention is to produce a converter product which contains substantial amounts of unreacted naphthalene. This result goes directly contrary to the optimum procedures for producing phthalic anhydride. We have found that not only is it possible to increase markedly the naphthoquinone content of the converter product produced but this increase is obtained without any substantial decrease in the total yield of oxidation product produced, based on naphthalene which has actually been oxidized. Since the procedure for obtaining anthraquinone described in the Lecher and Whitehouse patent referred to above, automatically as a part of the process recovers unreacted naphthalene and phthalic anhydride, we have the unusual situation of an improved process of producing one constituent without adversely affecting the production of the other constituent. In order to produce a converter product containing unreacted naphthalene, we have found it necessary to operate at lower temperatures than can be used for effective production of phthalic anhydride and higher naphthalene loadings. The two factors of temperature and naphthalene loading are mutually dependent. Higher temperatures and higher naphthalene loadings produce more unreacted naphthalene. At lower temperatures, a lower loading is used. In general, the temperatures run from a minimum of 250° C. to a maximum of about 425° C. The naphthalene loadings for optimum results fall within the range from 0.5% to 2% over the temperature range of 300–425° C. Slightly lower loadings may be used at still lower temperatures. The naphthalene loadings are referred to throughout the specification and claims in the conventional manner for modern vapor phase catalytic oxidation, namely, in mol percent, that is to say, mols of naphthalene per hundred mols of air.

Contact time is an important factor and strangely enough, it is much longer than in the case of the production of phthalic anhydride where in the past, contact times of less than 4 seconds have been recommended. In spite of the fact that the present invention depends on a much lower degree of oxidation, which would ordinarily dictate much shorter contact times, we have found that just the opposite is true and that contact times should be 8 seconds or more. Of course, the contact time is not an isolated variable and depends to some extent on temperature. The lower limit of 8 seconds can only be used at the top of the temperature range. At lower temperatures contact times will preferably be longer and may reach 50 seconds.

As far as the operation of the fluidized catalyst converter is concerned, it is an advantage of the present invention that standard procedures may be used and no new techniques are required. Depending on the physical nature of the fluidized catalyst used, gas velocities from ½ to 3 feet per second are employed, which is in accordance with good practice. Optimum results are usually obtained with gas velocities of from 1 to 2 feet per second.

The process of oxidizing naphthalene to naphthoquinone may be carried out with ordinary vanadium oxide catalyst such as have been employed for the production of phthalic anhydride. However, we have found that certain promoted vanadium oxide catalyst prepared in a particular way give optimum amounts of naphthoquinone. These special catalysts are, indeed, excellent catalysts for the oxidation of hydrocarbons in general. The preferred catalysts are promoted by oxides of metals of groups III–B and IV–A of the periodic system.

In general, it is possible, by use of the catalysts of the present invention, to produce a converter product having a naphthoquinone to phthalic anhydride ratio of from 1:1 to about 1:20. As the naphthoquinone to phthalic anhydride ratio is increased, the amount of unreacted naphthalene also increases and a compromise is usually struck between reasonable naphthoquinone content and adequate yields. The compromise is dictated largely by economic factors, one of which is the market for phthalic acid because, when the product of the present invention is used to prepare anthraquinones, the phthalic anhydride is recovered as phthalic acid. When there is a good demand for phthalic acid, therefore, the naphthoquinone content of the product should not be increased to the point where it would seriously restrict output. On the other hand, where the market for phthalic acid is not so great or where its price is sufficiently lower than that of phthalic anhydride so that transformation into the latter is uneconomic, it pays to strive for maximum naphthoquinone content even at some loss of phthalic anhydride. It is an advantage of the present invention that it is very flexible and the best compromise can be chosen to suit the economic conditions.

It is possible to produce naphthoquinone using the catalysts of the present invention in a manner so that it is not necessary to regenerate the catalyst at frequent intervals. This, however, will normally require either higher temperatures or lower naphthalene loadings and with some catalysts results in a less satisfactory naphthoquinone content. It is possible to operate with higher naphthalene loadings and/or lower temperatures so that the catalyst is gradually reduced, that is to say, the vanadium oxide is gradually transformed from the pentavalent to the tetravalent form. This requires regeneration of the catalyst by air at reaction temperatures and can be effected either by batch regeneration processes or by continuously regenerating a portion of the catalyst. Continuous regeneration can be carried out very effectively by introducing the air and naphthalene vapors into different parts of the fluidized catalyst bed. Thus, hot air, or a portion of the hot air may be introduced in the bottom of the converter and naphthalene vapors introduced at some higher point in the catalyst bed. The hot air and the re-oxidized reduced catalyst are in the bottom of the bed and as the bed is in constant turbulence, the catalyst, reduced by high naphthalene loadings or lower temperatures in the upper part of the bed, gradually passes down to the regenerating zone. Catalyst regeneration where the economics of the process make it desirable is comparatively much simpler than in most fluidized catalytic processes such as petroleum cracking where the regenerating equipment is much more elaborate and presents a more serious problem.

According to the present invention, catalysts can be prepared which are highly effective in the oxidation of hydrocarbons, and specifically in the oxidation of naphthalene to produce a converter product rich in naphthoquinone. These catalysts essentially have silica gel carriers with vanadium pentoxide as the active catalytic ingredient stabilized with larger amounts of alkali metal compounds such as potassium acid sulfate than normally used in catalysts for the production of phthalic anhydride by the vapor phase oxidation of naphthalene. The presence of substantial amounts of alkali salts is an essential part of the catalyst of this invention. Catalysts have been described using some ingredients common to those of this invention, but the alkali salts have been substantially removed by washing or the preparation has utilized volatile alkali salts, such as those of the ammonium ion, to form by-products which would be driven off by heat during the calcining. In the preparation of the catalysts of the present invention, the alkali salts are kept in the catalyst by avoiding washing steps. We do not know exactly why the catalysts of our invention must have the alkali salt stabilizer and do not wish to be bound by any theory thereon.

The vanadium pentoxide catalyst is promoted with a minor amount of an oxide of a metal of group III-B or IV-A of the periodic system. The usual metal used as promotor is aluminum. However, especially useful are oxides of zirconium and thorium (from group IV-B). With these, converter products richer in 1,4 naphthoquinone and containing substantial amounts of unreacted naphthalene are obtained.

The present invention is not limited in its broader aspects to catalysts in which the silica gel is produced at any particular pH. In more specific aspects, however, a preferred modification involves catalysts in which silica gel is precipitated at a pH not exceeding 8 and, more especially, not exceeding 6. The invention includes the new process of preparing such catalysts. It is not known why the catalysts in which the gel is prepared on the acid side give better results in the oxidation of naphthalene to a converter product rich in naphthoquinone and it is not intended to limit the invention to any theory of why these preferred catalysts give improved results.

The invention will be described in greater detail in conjunction with the following specific examples. The parts shown are by weight.

Example 1

The aluminum oxide-$V_2O_5$ catalyst was prepared by adding to 31.5 lbs. of 30° Bé. potassium silicate solution in 86 lbs. of water, 30.5 lbs. of 17% sulfuric acid, the addition being rapid and with constant stirring. The pH was then adjusted to 8.0 by the addition of concentrated ammonium hydroxide, and 8.55 lbs. of ammonium metavanadate dissolved in 26.5 lbs. of water, containing 350 cc. of ammonium hydroxide, was then added to the slurry. Then 342 grams of potassium aluminum sulfate and 2.1 liters of hot water also were introduced and the slurry concentrated by evaporation to about half its original volume. A gel formed, which was dried at 100° C., calcined at 450° C. and ground to fluidized catalyst fineness.

Example 2

The procedure of Example 1 was followed but the potassium aluminum sulfate was replaced with 135 grams of zirconium nitrate in 1.5 liters of water.

Example 3

953 parts of 30° Bé. potassium silicate solution and 2600 parts of water was mixed with 57 parts of ammonium metavanadate and 920 parts of 17% sulfuric acid, and the pH adjusted to 6.0 by means of concentrated ammonium hydroxide. The temperature was then raised to about 65° C. and 9 parts of zirconium nitrate dissolved in 100 parts of water added. The slurry was aged at the same temperature and then the temperature raised to evaporate the water until the volume was reduced by from ½ to ⅔. The orange colored slurry was then dried at 100° C., calcined at 450° C. and ground to fluidized catalyst fineness.

Example 4

953 parts of 30° Bé. potassium silicate was dissolved in 2600 ml. water, placed in an enameled pail and stirred. 57 g. of powdered ammonium metavanadate was added slowly and allowed to dissolve. 920 g. of 17% sulfuric acid was then added and the gel brought to pH 8 with ammonia. The temperature of the thick gel was brought to 65° C. and a solution of 13.5 g. thorium nitrate in water added. The gel was stirred at 65° C. for one hour. Then the temperature was raised to 95–100° C. and the slurry evaporated with stirring to one third of its original volume. The product was placed in a tray and dried at 110° C., ignited at 450° C., ground and sized in the usual way.

Example 5

The procedure of Example 4 was followed except that the pH of the gel after sulfuric acid addition was brought to 6 instead of 8.

Example 6

The procedure of Example 1 was followed but the pH was adjusted with ammonium hydroxide to 6 instead of 8.

Example 7

A series of fluidized catalyst runs were made with various aluminum oxide promoted vanadium pentoxide catalysts prepared according to Example 1, zirconium promoted catalysts prepared according to Examples 2 and 3, and thorium catalyst prepared according to Examples 4 and 5. In each run conventional vapor phase catalytic operations were followed, that is to say, a mixture of naphthalene vapor and air were passed at an elevated temperature through a fluidized catalyst zone in a converter. The rate of flow of the gases as determined by contact time was maintained within the conventional range in which fluidized catalysts are suspended in the flowing vapors to form a fluidized zone. The conditions and the results obtained are shown in the following table in which the abbreviation NQ is used for naphthoquinone and PAA for phthalic anhydride. Naphthalene concentration is expressed conventionally in mol percent, that is to say, mols of naphthalene per 100 mols of air.

| Catalyst | Inlet Conc. Mole Percent | Temp., °C. | Contact Time, Sec. | Yields, lbs./100 Naphthalene | | Naphthalene |
|---|---|---|---|---|---|---|
| | | | | N. Q. | P. A. A. | |
| $Al_2O_3$—$V_2O_5$ | 1.1 | 300 | 8 | 23–26 | 45–55 | 31–43 |
| $Al_2O_3$—$V_2O_5$ | 1.1 | 290 | 11 | 20–25 | 50–60 | 28–41 |
| $Al_2O_3$—$V_2O_5$ | 2.0 | 305 | 11 | 20–25 | 50–60 | 23–41 |
| $Al_2O_3$—$V_2O_5$ | 1.3 | 315 | 8 | 20–23 | 55–60 | 26–36 |
| $Al_2O_3$—$V_2O_5$ | 1.7 | 310 | 11 | 20–22 | 55–65 | 26–36 |
| $Al_2O_3$—$V_2O_5$ | 1.6 | 305 | 13 | 19–23 | 45–55 | 34–45 |
| $Al_2O_3$—$V_2O_5$ | 1.0 | 330 | 8 | 25–35 | 40–60 | 20–45 |
| $ZrO_2$—$V_2O_5$ Neutralized to pH 6 | 1.0 | 320 | 12 | 25–33 | 45–60 | 22–42 |
| | 2.0 | 330 | 12 | 25–33 | 45–60 | 22–42 |
| $ZrO_2$—$V_2O_5$ Neutralized to pH 8 | 1.0 | 300 | 8 | 20–26 | 45–55 | 31–44 |
| | 1.0 | 290 | 11 | 20–25 | 50–60 | 28–40 |
| $ThO_2$—$V_2O_5$ Neutralized to pH 8 | 1.0 | 310 | 8 | 23–25 | 50–60 | 28–38 |
| $ThO_2$—$V_2O_5$ Neutralized to pH 6 | 1.0 | 330 | 8 | 25–34 | 45–60 | 21–42 |

The data on yields in the above table are given in the form of ranges representing the results of a number of runs under the conditions as given. Some of the runs were made in a laboratory converter and some in a converter of pilot plant capacity.

This application is a continuation-in-part of the application of Dixon, Tribit, and Fugate, Serial No. 377,248, filed August 28, 1953, now U. S. Patent No. 2,765,323, which in turn was a continuation-in-part of Serial No. 236,842, filed July 14, 1951, now abandoned. It is also a continuation-in-part of the application of Dixon, Tribit, and Fugate, Serial No. 236,843, filed July 14, 1951, now abandoned.

We claim:

1. A method of preparing a catalyst for the fluidized catalyst oxidation of organic compounds which comprises reacting a potassium silicate with sulfuric acid at a pH not in excess of 8, precipitating in the gel a major amount of vanadium pentoxide and a minor amount of a promoter consisting of an oxide of a metal selected from the group consisting of aluminum, zirconium, and thorium, drying the entire precipitation mixture without washing out any soluble material, calcining, and grinding to fluidized catalyst fineness.

2. A method according to claim 1 in which the metal is thorium.

3. A method according to claim 1 in which the metal is zirconium.

4. A method according to claim 2 in which the silicate and acid are reacted at a pH not in excess of 6.

5. A method according to claim 3 in which the silicate and acid are reacted at a pH not in excess of 6.

6. A catalyst prepared by the process of claim 1.

7. A catalyst prepared by the process of claim 2.

8. A catalyst prepared by the process of claim 3.

References Cited in the file of this patent

UNITED STATES PATENTS

| 2,395,836 | Bates | Mar. 5, 1946 |
| 2,415,878 | Hale | Feb. 18, 1947 |
| 2,698,330 | Fugate et al. | Dec. 28, 1954 |